US008814080B2

(12) United States Patent
Dumont et al.

(10) Patent No.: US 8,814,080 B2
(45) Date of Patent: Aug. 26, 2014

(54) AERODYNAMIC AFT FAIRING OF AN AIRCRAFT ENGINE SUSPENSION PYLON

(75) Inventors: Jean-François Dumont, Thil (FR); Marc Lefort, Pompertuzat (FR)

(73) Assignee: Airbus Operations (S.A.S.), Toulouse (FR)

( * ) Notice: Subject to any disclaimer, the term of this patent is extended or adjusted under 35 U.S.C. 154(b) by 116 days.

(21) Appl. No.: 13/534,967

(22) Filed: Jun. 27, 2012

(65) Prior Publication Data

US 2013/0032662 A1 Feb. 7, 2013

(30) Foreign Application Priority Data

Jun. 28, 2011 (FR) ...................................... 11 55773

(51) Int. Cl.
*B64D 27/00* (2006.01)
(52) U.S. Cl.
USPC ............ 244/54; 244/121; 60/39.11; 428/157
(58) Field of Classification Search
USPC ............................ 244/54, 53 R; 60/796–798; 248/554–557
See application file for complete search history.

(56) References Cited

U.S. PATENT DOCUMENTS

| 4,238,092 | A  | * | 12/1980 | Brennan ......................... 244/54 |
| 4,712,750 | A  | * | 12/1987 | Ridgwell .................. 244/117 A |
| 6,340,135 | B1 | * | 1/2002  | Barton ......................... 244/53 B |
| 7,988,092 | B2 | * | 8/2011  | Bonnaud et al. ............. 244/121 |
| 8,118,252 | B2 | * | 2/2012  | Dumont et al. ................. 244/54 |
| 8,336,812 | B2 | * | 12/2012 | Beaufort et al. ............... 244/54 |
| 2003/0201366 | A1 | * | 10/2003 | Connelly et al. ............. 244/121 |
| 2008/0067292 | A1 | * | 3/2008  | Bonnaud et al. ........... 244/199.1 |
| 2008/0169378 | A1 | * | 7/2008  | Beaufort et al. ............... 244/54 |
| 2009/0095443 | A1 | * | 4/2009  | Connelly ........................ 165/51 |
| 2009/0200418 | A1 | * | 8/2009  | Beaufort ........................ 244/54 |
| 2010/0051743 | A1 | * | 3/2010  | Dumont et al. ................. 244/54 |
| 2011/0155847 | A1 | * | 6/2011  | Journade et al. ............... 244/54 |
| 2012/0190680 | A1 |   | 7/2012  | Bakthavatchalam et al. |

FOREIGN PATENT DOCUMENTS

| FR | 2913665 | 9/2008 |
| FR | 2921342 | 3/2009 |
| GB | 2461791 | 1/2010 |

OTHER PUBLICATIONS

French Search Report for Application No. FR 1155773 dated Dec. 27, 2011.

\* cited by examiner

*Primary Examiner* — Christopher P Ellis
*Assistant Examiner* — Medhat Badawi
(74) *Attorney, Agent, or Firm* — Jenkins, Wilson, Taylor & Hunt, P.A.

(57) ABSTRACT

An aerodynamic aft fairing of an engine pylon ensuring the mounting of an engine underneath a wing of an aircraft is provided. The aerodynamic aft fairing includes an outer lateral panel and an inner lateral panel assembled together at least by a bottom panel, the bottom panel comprising, on either side of the lateral panels, an extension forming an aerothermic barrier capable of channeling hot air flows leaving the engine. The inner lateral panel and the outer lateral panel are attached to the bottom panel by a first angle bar and a second angle bar, respectively.

6 Claims, 5 Drawing Sheets

AERODYNAMIC AFT FAIRING OF AN AIRCRAFT ENGINE SUSPENSION PYLON

CROSS-REFERENCE TO RELATED APPLICATION

This application claims priority to French Patent Application No. 11 55 773 filed on Jun. 28, 2011, the entire content of which is incorporated by reference herein.

FIELD OF THE INVENTION

The invention relates to an aerodynamic aft fairing for a suspension pylon ensuring the mount of an engine under an aircraft wing. This fairing consists of an aerothermic barrier suitable for channeling hot air flows leaving the engine.

The invention has applications in aerospace field and in particular for mounting engines under the wings. The invention can find applications on all types of turbojet or turboprop aircraft engines wherein the engine is mounted below the wing.

STATE OF THE ART

In aeronautics, many aircrafts are equipped with engines, or reactors, mounted under the wings. Such reactors are generally mounted by means of a suspension device allowing, on the one hand, to transmit the thrust generated by the associated reactor to the aircraft structure, and, on the other hand, to carry electrical and hydraulic systems, air, and fuel between the reactor and the aircraft fuselage.

The suspension device generally comprises a suspension or mounting pylon set between the reactor and the wing. In order to ensure power transmission, said suspension pylon generally comprises a rigid structure, or primary structure, comprising a set of panels assembled to each other. The suspension pylon also includes suspension and aerodynamic fairing elements, including a lower aft aerodynamic fairing, also called APF (Aft Pylon Fairing). The role of such lower aft aerodynamic fairing, in particular, is to form a thermal barrier to hot air flows leaving the reactor, and to provide for aerodynamic continuity between said reactor output and the suspension pylon structure.

The lower aft aerodynamic fairing, or APF, is generally formed as a box comprising two lateral panels connected together by a bottom panel. The lower aft aerodynamic fairing, later called APF, is located aft of the engine. Because of its proximity to the engine, such APF is subject to very high sonic, temperature, and FBO (Fan Blade Out, i.e. loss of blade fan) fatigue stresses. To limit such thermal and aerodynamic stresses, APF fairing generally includes flaps attached laterally on each lateral panel to channel hot air flows coming off of the engine. These flaps form a thermal protection barrier for the engine pylon and the wing located substantially above and behind the reactors. Their role is to direct and hold down hot air flows leaving the reactor, so that said hot air flows would not rise towards the engine pylon and the wing, thus guarding against a risk of temperature rise.

Currently, in some aircraft, flaps consist of single forged and machined parts, attached on the bottom panel and on one lateral panel. Such part is machined by itself, independent of the suspension pylon panels. It is then attached on the panels and secured to said panels with fish joints. Mounting such flap requires thus a first operation of fish joining the flap on the lateral panel and a second operation of fish joining the flap to the bottom panel.

As shown in FIGS. 1A and 1B, examples of such a flap are referred to as 10. As shown in these figures, flap 10 is a solid piece, machined to obtain the shape shown in FIGS. 1A and 1B. In the example in FIG. 1A, flap 10 has a smooth zone 11 forming the thermal barrier. It also includes a lateral ridge 12 and a central ridge 13. Side ridge 12 is to be welded to the lateral panel of the suspension pylon and to central ridge 13 on the bottom panel of said pylon. In the example in FIG. 1B, flap 10 includes a thermal barrier 11 and a side ridge 14 mounted to the lateral panel, and a central ridge 15 attached on the bottom panel. In this example, flap 10 includes an extension of central ridge 15 and lateral ridge 14 forming fastener 16.

An example of flap 10 in FIG. 1A, mounted on a suspension pylon, is shown as a side view in FIG. 2. FIG. 2 shows suspension pylon 20 with its bottom panel 21 and a side pylon 20 shown in overlay. FIG. 2 shows flap 10 mounted through its central ridge 13 on bottom panel 21 and, through its side ridge 12 on outer lateral panel 22. A flap of identical shape is placed parallel to flap 10 on the inner panel of the suspension pylon. The lateral panel opposite to the aircraft fuselage, when the suspension pylon is installed on the aircraft, is called the "inner panel" of the suspension pylon, and the panel opposite to the inner panel is called the "outer panel" of the suspension pylon.

In FIG. 3, a flap of the prior art is schematically illustrated. This figure shows that flap 10 is a separate piece, welded on the one hand to lateral panel 22 and on the other hand to bottom panel 21.

Such flap, made separate of any part of the suspension pylon, has the disadvantage of being relatively heavy since manufactured through machining out of a metal block. This flap is, indeed, massive, forged, and machined from a block of material, and welded on the suspension pylon fairing. Such a flap has a mass of about 20.6 kg per APF fairing.

It is thus understandable that manufacturing and installing such flap is a relatively high portion of an aircraft manufacturing cost. However, it is impossible to do without thermal barriers on an aircraft due to the destructive effects of hot airflows on the engine pylon fairing and on the wings.

DESCRIPTION OF THE INVENTION

The invention is specifically designed to overcome the disadvantages of the techniques described above. To this end, the invention provides an aft aerodynamic fairing for a suspension pylon wherein an aerothermic barrier is produced by extending one of the panels of said fairing. The aerothermic fairing is intended, in use, for channeling hot air flows leaving the engine of an aircraft also comprising fuselage and wings. The aerothermic barrier being integral of a panel, the suspension pylon saves mass and manufacturing cost.

More specifically, the invention relates to an aft aerodynamic fairing of a suspension pylon securing an engine mount under an aircraft wing, comprising an inner lateral panel located opposite the aircraft fuselage, and an outer lateral panel located opposite the inner lateral panel, when said fairing is installed on the aircraft. The inner lateral panel and the outer lateral panel are separated from each other by a distance d. The inner lateral panel and the outer lateral panel are assembled together by means of at least one bottom panel. The fairing is characterized by the fact that the bottom panel comprises, on either side of the lateral panels, an extension forming an aerothermic barrier intended, in use, for channeling hot air flows leaving the engine.

Such a fairing has the advantage of being lighter than a fairing with flap. It is also cheaper to manufacture than a conventional fairing.

The aft aerodynamic fairing of the invention may comprise one or more of the following:
- the bottom panel has a transverse dimension greater than distance d;
- the extension of the bottom panel has a longitudinal profile parallel to that of the lateral panel;
- the inner lateral panel is assembled to the bottom panel by means of a first angle bar secured in an angle formed by the bottom panel and the inner lateral panel;
- the outer lateral panel is assembled to the bottom panel by means of a second angle bar secured in an angle formed by the bottom panel and the outer lateral panel;
- the first and second angle bars are made of sheet metal;
- the first and second angle bars are produced by hot pressing;
- the first angle bar is secured to the inner lateral panel, on the one hand, and to the bottom panel, on the other hand, with rivets or screws;
- the second angle bar is secured to the outer lateral panel, on the one hand, and to the bottom panel, on the other hand, with rivets or screws;

The invention also concerns an aircraft comprising at least one fuselage and at least one wing wherein it comprises at least one suspension device as described above.

DETAILED DESCRIPTION OF EMBODIMENTS OF THE INVENTION

Figure 1A:
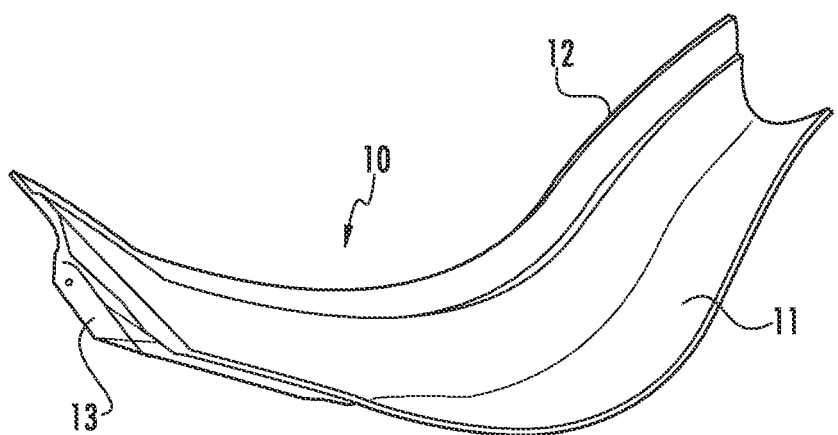
FIGS. 1A and 1B, already described, show a flap according to prior art.
Figure 1B:
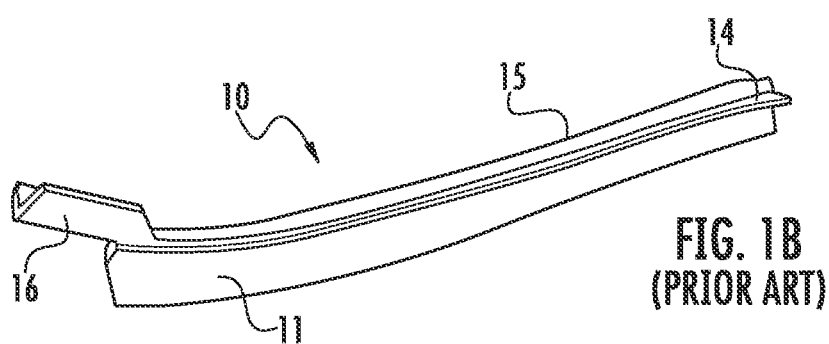
Figure 2:
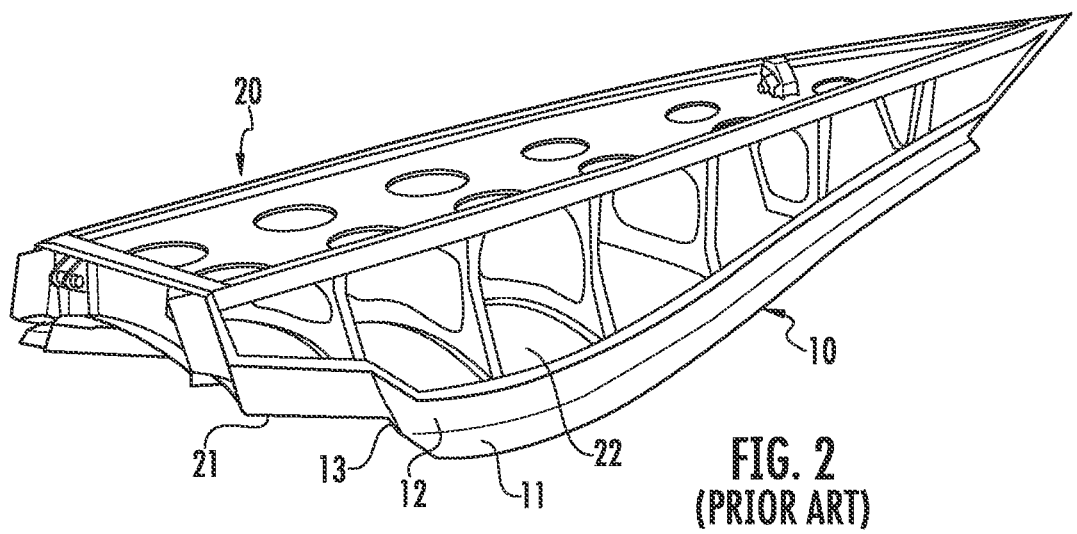
FIG. 2, already described, shows a partial view of a suspension pylon with a flap according to FIG. 1A.
Figure 3:
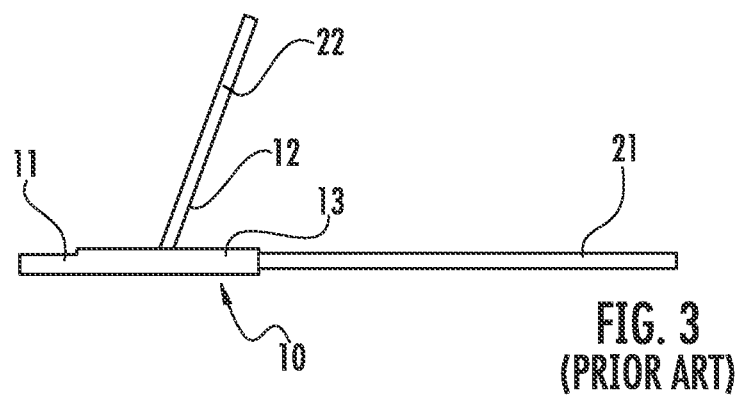
FIG. 3, already described, shows a schematic view of a flap attached to a lateral panel and a bottom panel according to prior art.
Figure 4A:
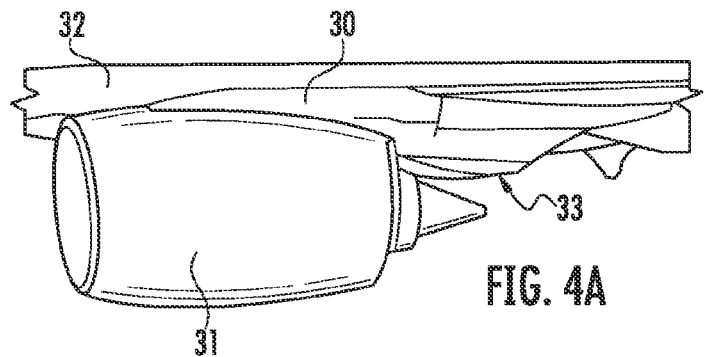
FIGS. 4A, 4B, and 4C are general views of a suspension device for an under-wing engine, when an aft aerodynamic fairing is equipped with an aerothermic barrier of the invention.
Figure 4B:
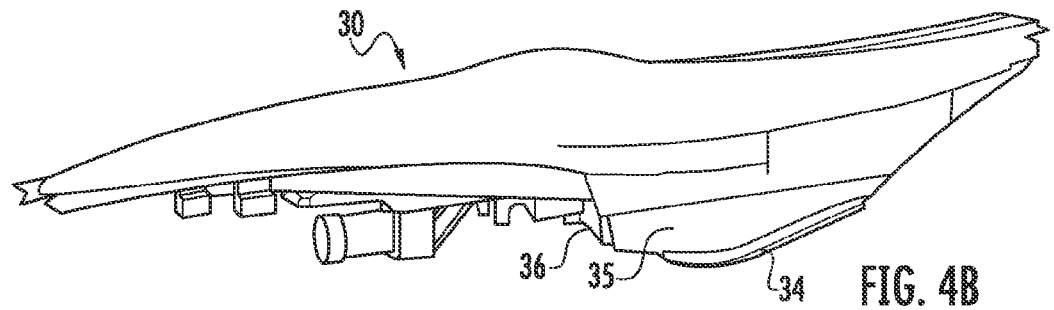
Figure 4C:
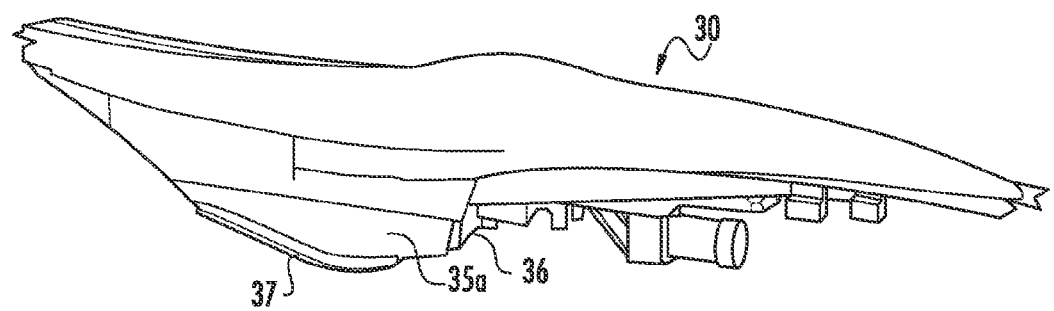

The invention relates to an APF fairing with an aerothermic barrier as integral component of a panel of said fairing. FIGS. 4A, 4B, and 4C show a general view of a suspension pylon 30 securing a reactor 31 under a wing 32 of an aircraft. Suspension pylon 30 has an APF fairing 33 located in the lower part of the suspension pylon, at the outlet of reactor 31. The APF fairing has an inner lateral panel 35a, an outer lateral panel 35 and a bottom panel 36. The inner lateral panel and the outer lateral panel are separated from each other by a first distance. It also includes two aerothermic barriers, each barrier being located along one of the lateral panels. In FIG. 4B, only outer aerothermic barrier 34 is visible, said barrier being located along outer lateral panel 35. In FIG. 4C, only inner aerothermic barrier 37 is visible, said barrier being located along inner lateral panel 35a.

Figure 5:
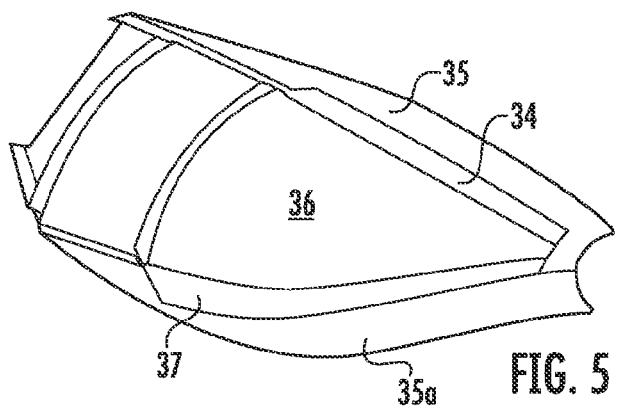
FIG. 5 shows a bottom view of an APF fairing equipped with an aerothermic barrier of the invention.

FIG. 5 illustrates a bottom view of the APF fairing in FIGS. 4B and 4C. FIG. 5 shows bottom panel 36 of the APF fairing with its aerothermic inner barrier 37 and aerothermic outer barrier 34. As seen in this figure, bottom panel 36 comprises, on each side of the lateral panels, two longitudinal extensions forming aerothermic barriers 34 and 37.

The extension is part of the bottom panel located beyond a lateral panel, in line with the bottom panel. According to the invention, each extension is made of the same material as the bottom panel, integral with said bottom panel. Thus, bottom panel 36 has extension 37 on the side of the inner lateral panel 35a and extension 34 on the side of outer lateral panel 35. In other words, bottom panel 36, with its extensions 34 and 37, has a transverse dimension greater than the distance d between the inner lateral panel and the outer lateral panel.

Each extension has a longitudinal profile parallel to the lateral panel, forming an aerothermic barrier able to channel hot air flows leaving the engine.

Figure 8:
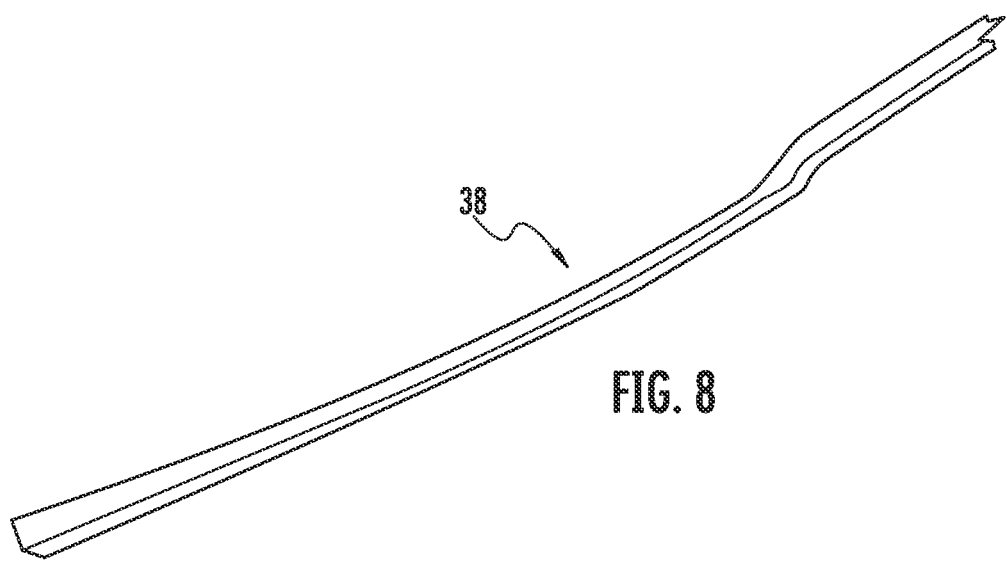
FIG. 8 shows schematically an angle bar used to secure an aerothermic barrier of the invention.

Although the aerothermic barrier of the invention is integral with bottom panel 36, it must still be secured along the lateral panel to which it is associated in order to close the fairing. For this purpose, the invention proposes to use angle bar, generally designated 38, as shown in FIG. 8. Said angle bar 38 is intended to be secured in the angle formed by bottom panel 36 and lateral panel 35.

Figure 6A:
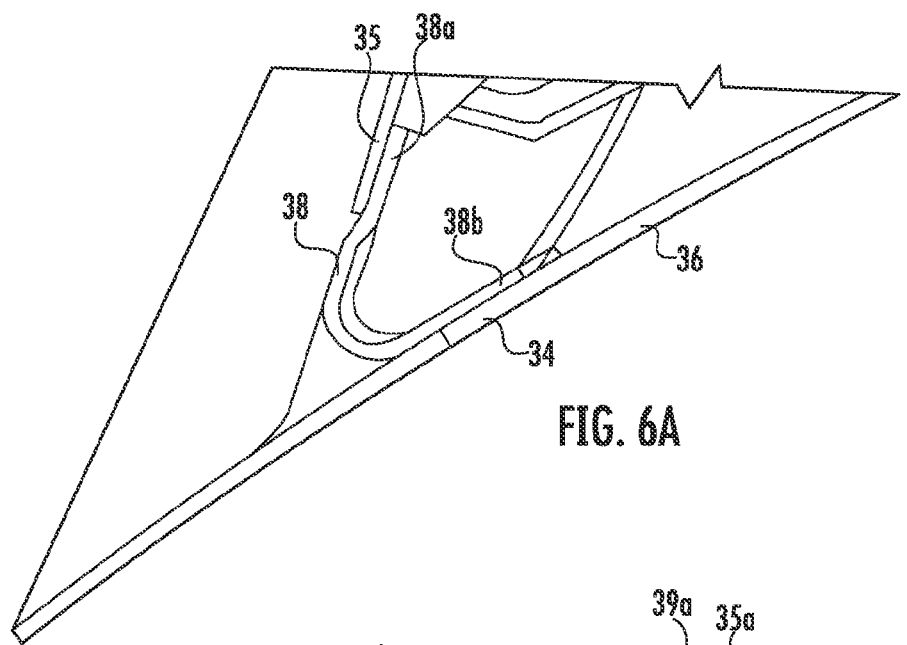
FIGS. 6A and 6B show a cross-section view of an APF fairing equipped with an aerothermic barrier of the invention.
Figure 6B:
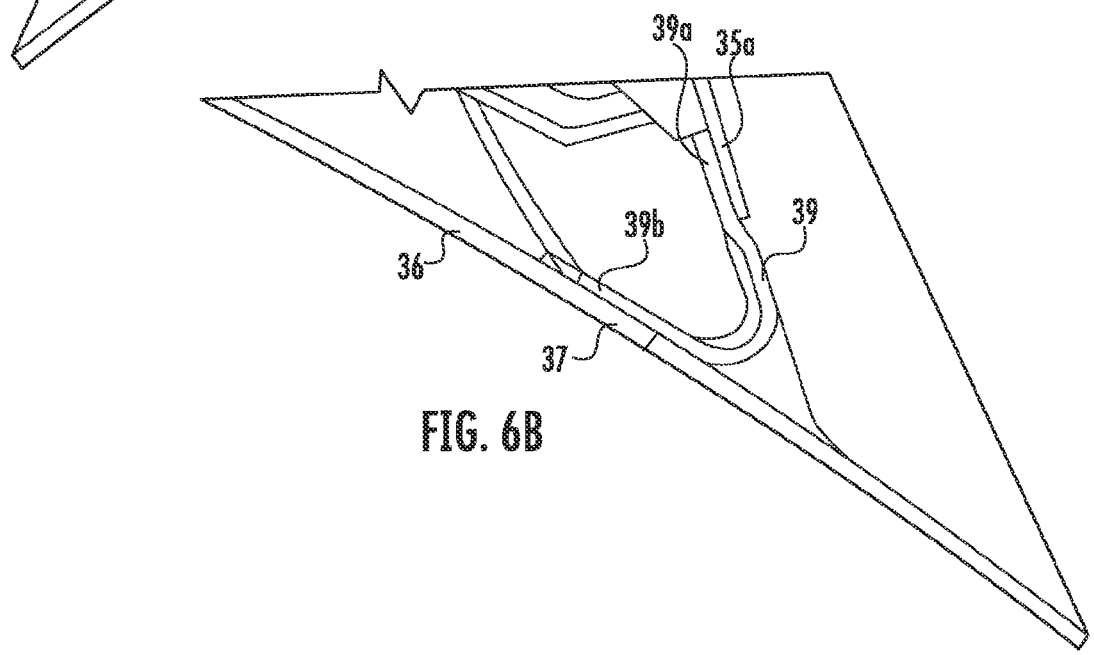

An example of the assembly of bottom panel 36 with lateral panel 35 by means of angle bar 38 is shown in FIG. 6. FIG. 6 shows that one end 38a of angle bar 38 is secured on lateral panel 35 and one end 38b of said angle bar 38 secured to bottom panel 36. In this way, angle bar 38 can close the angle between the bottom panel and the lateral panel and the attachment of the bottom panel on the lateral panel. FIG. 6B shows an example of the assembly of bottom panel 36 with lateral panel 35a by angle bar 39. One end 39a of angle bar 39 is secured on inner lateral panel 35a and one end 39b of the angle bar 39 is secured to bottom panel 36. In this way, angle bar 39 can close the angle between the bottom panel 36 and the lateral panel 35a and the attachment of the bottom panel 36 on the lateral panel 35a. It will be understood that the first angle bar 39 fastens bottom panel 36 on the inner lateral panel 35a and a second angle bar 38 fastens bottom panel 36 on the outer lateral panel 35.

In a preferred embodiment of the invention, angle bar 38 is a sheet metal piece, made for example by hot pressing. Indeed, as angle bar 38 is not subject to aerodynamic forces, a sheet metal part is sufficient to secure both panels together. Furthermore, angle bar 38 is a simple shape to manufacture. Indeed, as shown in FIG. 8, angle bar 38 has a gutter shape which length adapted to the length of the bottom panel.

Said angle bar 38 is attached over the entire length of bottom panel 36.

Figure 7A:
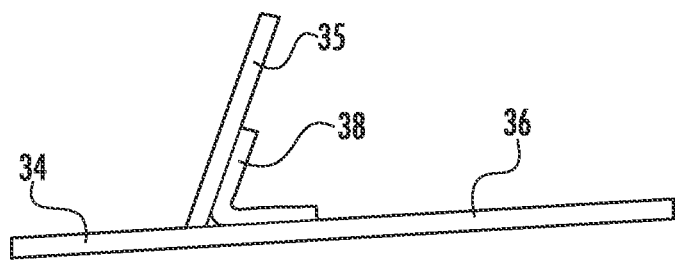
FIGS. 7A and 7B schematically show two embodiments of the aerothermic barrier of the invention.
Figure 7B:
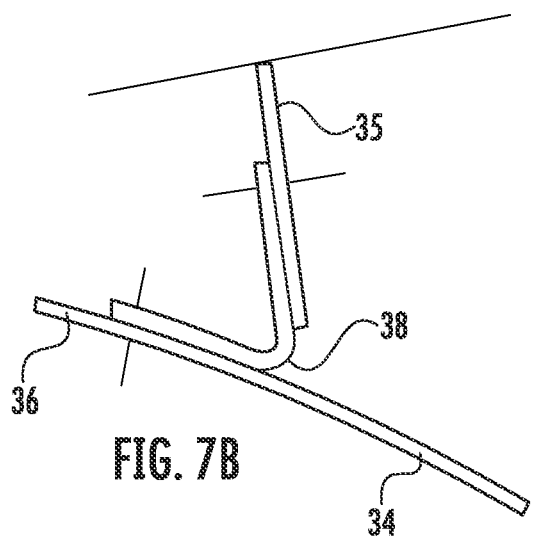

The assembly of bottom panel 38 and lateral panel by means of angle bar 38 can be carried out in different ways. Two embodiments of this assembly are shown in FIGS. 7A and 7B. In the embodiment of FIG. 7A, aerothermic barrier 34 of the invention is an extension of bottom panel 36 beyond lateral panel 35. Lateral panel 35 is abutted against bottom panel 36. Fastening between panels 36 and 35 is carried out, over the entire length of bottom panel 36, by angle bar 38 placed inside the angle formed by said lateral panel and said bottom panel.

In the embodiment of FIG. 7B, lateral panel 35 does not contact bottom panel 36. Lateral panel 35 is therefore substantially distant from bottom panel 36 to which it is secured by angle bar 38. In this embodiment, in addition to securing both panels, angle bar 38 ensures the closure of the angle made by those panels. In this embodiment, angle bar 38 can be rounded, to facilitate manufacturing by pressing said angle bar. In addition, the lateral panel being shorter, it offers a mass saving overall.

As shown in FIG. 7B, angle bar 38 is fastened to each panel in a conventional way, for example, by screws or rivets. Such fastening, notably riveting, is relatively simple and quick as well as relatively inexpensive.

The aerothermic barrier described above is advantageously made integral with the bottom panel. It is understandable that its manufacturing cost is considerably less than the cost of manufacturing and assembling a flap according to prior art. Indeed, the fairing cost matches substantially to the cost of a conventional bottom panel. It requires no special manufacturing, except for the angle bar. However, manufacturing a part by pressing is much cheaper than making a flap according to prior art. The cost of such aerothermic fairing is of about € 2K or € 4K per APF fairing, and the NRC cost is around € 150K including tooling to produce multiple parts at a time.

Moreover, such aerodynamic fairing has the advantage of being lighter than a conventional flap. Indeed, the fairing being an extension of the bottom panel, it is made of the same material. Furthermore, the sheet metal angle bar is of relatively light weight. Such aerothermic fairing has a mass, angle bar included, of about 12 kg per APF. Thus, a suspension pylon with an APF fairing according to the invention is a weight saver.

The invention claimed is:

1. An aft aerodynamic fairing of a suspension pylon for securing an engine mount under an aircraft wing, and comprising an inner lateral panel and an outer lateral panel, assembled together by at least one bottom panel, wherein:
   the bottom panel comprises, on either side of the lateral panels, an extension forming an aerothermic barrier for channeling hot air flows leaving an engine;
   the inner lateral panel is attached to the bottom panel by a first angle bar secured in an angle formed by the bottom panel and the inner lateral panel;
   and the outer lateral panel is attached to the bottom panel by a second angle bar secured in an angle formed by the bottom panel and the outer lateral panel.

2. The fairing according to claim 1, wherein the inner lateral panel and the outer lateral panel are separated from each other by a first distance, and wherein each extension is integral with the bottom panel, the bottom panel having a transverse dimension greater than the first distance.

3. The fairing according to claim 1, wherein each extension of the bottom panel has a longitudinal profile parallel to that of the corresponding lateral panel.

4. The fairing according to claim 1, wherein:
   the first angle bar is secured to the inner lateral panel and to the bottom panel with rivets;
   and the second angle bar is secured to the outer lateral panel and to the bottom panel with rivets.

5. The fairing according to claim 1, wherein:
   the first angle bar is secured to the inner lateral panel and to the bottom panel with screws;
   and the second angle bar is secured to the outer lateral panel and to the bottom panel with screws.

6. An aircraft comprising at least one fuselage, at least one wing and at least one suspension device for an aircraft engine intended to be interposed between the wing and the aircraft engine, and wherein the suspension device comprises an aerodynamic aft fairing comprising an inner lateral panel facing the aircraft fuselage when the fairing is installed on the aircraft, and an outer lateral panel opposite the inner lateral panel, the inner lateral panel and the outer lateral panel being assembled together by at least one bottom panel, and such that:
   the bottom panel comprises, on either side of the lateral panels, an extension forming an aerothermic barrier for channeling hot air flows leaving the engine;
   the bottom panel is attached to the inner lateral panel through a first angle bar fastened in an angle formed by the bottom panel and the inner lateral panel;
   and the bottom panel is attached to the outer lateral panel through a second angle bar fastened in an angle formed by the bottom panel and the outer lateral panel.

* * * * *